Dec. 19, 1961   J. MAZZARINS   3,013,844
MASTER PIN
Filed May 18, 1960   2 Sheets-Sheet 1

INVENTOR.
Janis Mazzarins
BY
G.E. McGlynn Jr.
ATTORNEY

Dec. 19, 1961   J. MAZZARINS   3,013,844
MASTER PIN
Filed May 18, 1960   2 Sheets-Sheet 2

INVENTOR.
Janis Mazzarins
BY
ATTORNEY

United States Patent Office 3,013,844
Patented Dec. 19, 1961

3,013,844
MASTER PIN
Janis Mazzarins, Northfield, Ohio, assignor to General Motors Corporation, Detroit, Mich., a corporation of Delaware
Filed May 18, 1960, Ser. No. 29,846
10 Claims. (Cl. 305—58)

This invention relates to a master pin connection for joining the ends of a chain to make the latter endless and, in particular, to such a master connection which is particularly useful when employed in an endless track of the type with which crawler tractors are normally equipped.

The endless track for a crawler tractor typically comprises a plurality of pairs of laterally spaced links, the ends of adjacent pairs of links being pivotally interconnected by pin and bushing assemblies to form the endless track. In order to connect the mating ends of adjacent pairs of track links, it has been the common practice to form a secure press or interference fit between each end of the track pin and a pair of track links being connected. This interference fit must be rather great in order to insure that the track will remain connected under severe conditions of usage. On the other hand, it has been common practice to utilize a master pin in at least one portion of the track in order to facilitate assembly and disassembly of the track structure. To this end, it has been the conventional practice to provide a master pin which has only a slight interference fit between the ends thereof and the pair of track links to which it is being connected to facilitate insertion and removal of the pin and, therefore, assembly and disassembly of the ends of the articulated track structure. However, means have been provided in association with the master pin to insure that there will be a relatively great interference fit of the latter with the track link structure during use to retain the master pin in position under the severe conditions alluded to above.

Thus, it has been suggested to employ in the endless track structure at least one master pin which may be removably inserted between the mated ends of adjacent pairs of track links with a relatively slight interference fit to insure easy insertion and removal therefrom. Additionally, a tapered axially inwardly extending bore has been provided in each end of the master pin so as to receive a tapered plug for the purpose of spreading the pin ends into greater interfering engagement with the ends of a pair of track links being connected in the track structure. In some instances, the aforementioned tapered plugs and bores have also been threaded to insure that they remain in engagement. Such prior art constructions have met with some success, but are objectionable for several reasons.

In the first instance, due in part to the relative inelasticity of the master pin ends, the aforementioned tapered bores have been relatively long in order to receive a relatively long tapered plug to insure adequate spreading action of the pin ends to form the aforementioned interference fit. More often than not, the result of this construction has been that the tapered locking bores extend beyond the joint between the mated link ends being connected, thereby resulting in a mechanical weakness in the track structure at a joint in which bending moments and other forces are most severe. Additionally, notwithstanding the relatively extreme length of the tapered bores and cooperating tapered plugs, the forces imposed upon the pin structure always tend to squeeze or force the plug axially out of the end of the pin. Furthermore, the prior art plugs may extend axially beyond the ends of the master pin to such an extent as to result in possible interference with the usual track guard on the track frame.

Therefore, it is a principal object and feature of this invention to provide an improved master pin for an endless chain of the type employed in crawler tractor tracks, and which pin may be readily inserted and removed in the track while providing the necessary interference fit between the pin ends and the link ends to be mated while avoiding the various problems of the prior art as aforementioned.

It is yet another object and feature of this invention to provide a master pin for the mating ends of a pair of links for an endless chain or track which is characterized by improved elasticity of the pin ends for obtaining interfering engagement with the track links.

It is yet another object and feature of this invention to provide a master pin of the type aforementioned in which the pin may be of minimum length to avoid possible interference with crawler tractor track guards, while insuring maximum strength at the joint between the link ends being interconnected.

It is yet another object and feature of this invention to provide a master pin for an endless crawler track which will provide maximum strength at the point of interconnection of the track links, be of minimum length and include locking members wholly entirely contained within the track pin thereby avoiding interference with the track guards.

It is yet another object and feature of this invention to provide a pin construction of the type aforementioned with a novel means for removing the locking members from the bores of the track pins, and which removing means may be mounted substantially wholly entirely within the ends of the track pins for retention therein while the track is in use.

These and other objects of the invention, and the manner in which they are attained, will become more apparent hereinafter as the description of the invention proceeds, and in which reference is made to the following drawings in which.

Figure 1:
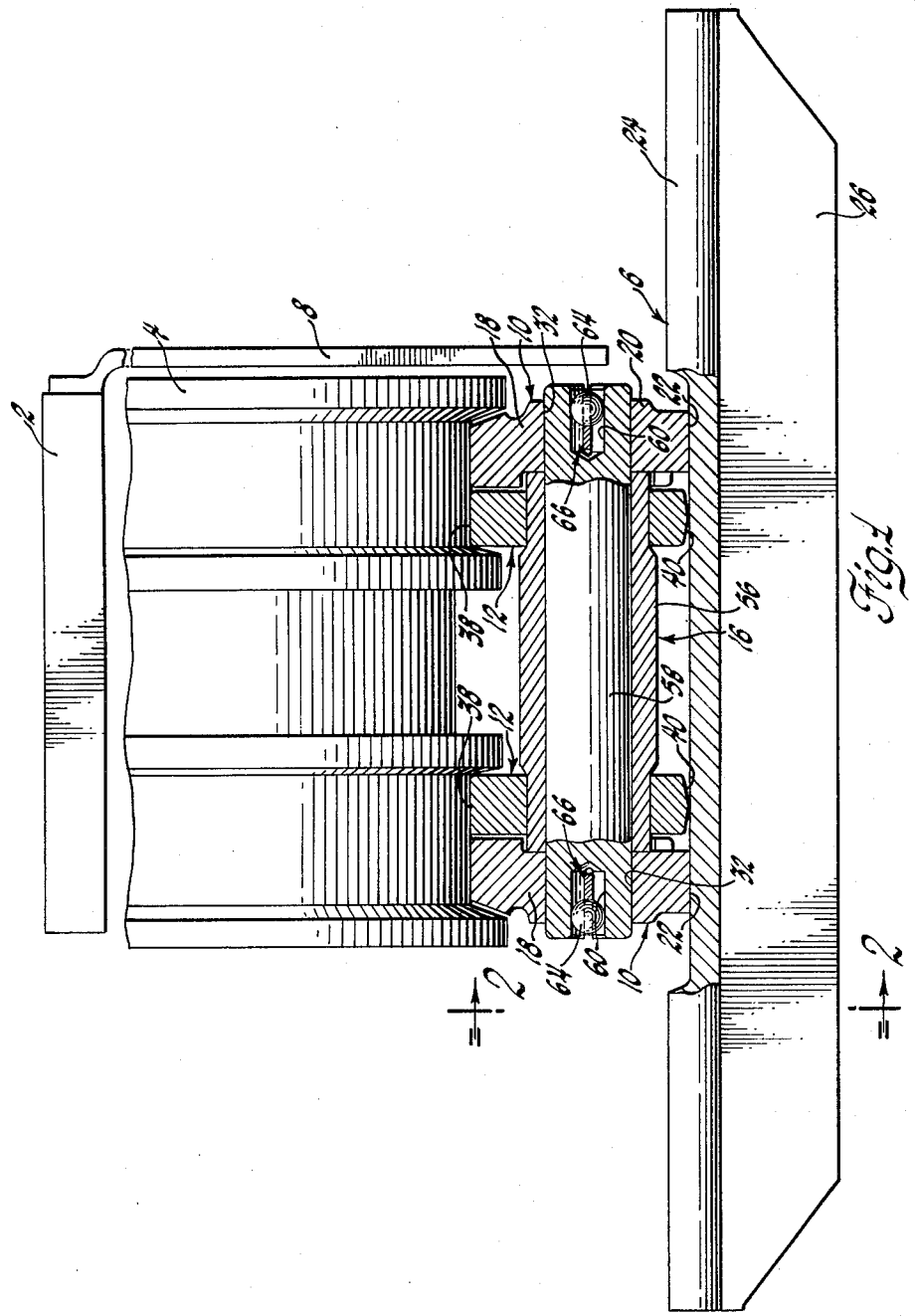
FIGURE 1 is an elevational view, partly in section, of a crawler track structure equipped with the present invention including one embodiment of a device for removing locking members from the pin ends.

Referring now to FIGURE 1, the numeral 2 indicates a conventional track roller frame of a crawler tractor upon which there are rotatably mounted a plurality of longitudinally spaced track rollers, one of which is indicated at 4, and about which the endless track 6 is adapted to be entrained. The usual track guard is indicated at 8, and, as will be apparent to those acquainted with this art, is adapted to have its upper edge rigidly secured to the longitudinally extending laterally outboard edge of the track roller frame 2 while the guard depends to a position adjacent the track structure 6.

Figures 2, 3, 4:
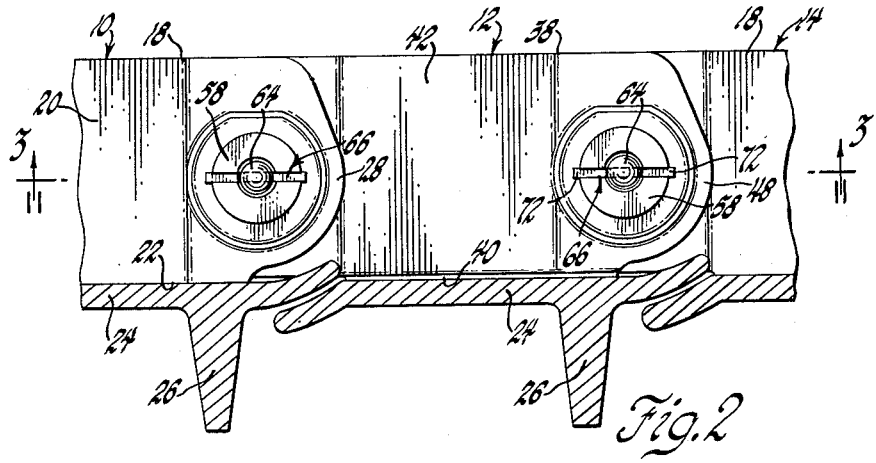
FIGURE 2 is a view taken on line 2—2 of FIGURE 1.
FIGURE 3 is a view taken on line 3—3 of FIGURE 2.
FIGURE 4 is a fragmentary view of a pin end illustrating another embodiment of a device for removing locking members from a pin end.

Referring now additionally to FIGURES 2 and 3, the endless track structure 6 may be seen to comprise a plurality of laterally fixedly spaced pairs of track links indicated, respectively, at 10, 12 and 14, the mating ends of which are adapted to be aligned and articulately connected by means of the standard pin and bushing assembly indicated generally at 16 and the master assembly indicated at 17. The track link pairs 10 and 14 are standard links which normally compose substantially all of the track structure, while the pairs of master links 12 and standard links 14 are located at the opposite ends of the track structure which is to be connected to form the endless track by the master pin and bushing assembly 17.

As will be apparent to those skilled in this art, each pair of standard track links 10 and 14 are identical, and each link of each pair of such links is substantially a mirror image of the other. Each link of each pair of standard links 10 and 14 has a body portion including an inner edge wall or rail 18 adapted to be entrained about the track rollers 4 as indicated in FIGURE 1, and each such rail is joined by a wall or web 20 to an outer edge wall or rail 22. A track shoe 24 including a depending laterally extending grouser portion 26 is adapted to be suitably secured between the rails 22 of each track link of each of the pair of standard links 10 and 14.

Referring to FIGURE 3, the opposite end portions 28 and 30 of each standard link are laterally offset from each other, and have cylindrical openings 32 and 34, respectively, extending laterally therethrough. Each opening is adapted to be aligned with the openings in the ends of a mating pair of track links for receiving the link pin and bushing assemblies 16 so as to connect the mating pairs of links together. The inner side wall of each of the ends 28 of the standard links 10 and 14 also includes an annular or circular recess 36 surrounding the opening 32 therein.

In similar fashion, the pair of master links 12 is substantially identical to the standard links previously described in that each of the master links includes a body portion having inner and outer surfaces or rails 38 and 40 joined by a wall or web 42, and one end 44 having a cylindrical opening 46 therethrough adapted to be aligned with the openings 32 in the ends 28 of the adjacent pair of standard links 10 for connection thereto by a pin and bushing assembly 16. The other ends 48 of the pair of master links 12 are laterally offset from the ends 44 thereof as with the standard links. Additionally, the ends 48 of each master link is provided with a cylindrical opening 50 therethrough surrounded by an annular recess 52 formed on the laterally inner side wall of this end of each master link. Unlike the standard link ends 28, however, the aforementioned side wall of each master link end 48 is cut away or relieved preferably to a depth and width at least equal to the depth and diameter of the recess 52 so as to form an access passage 54 opening from each recess substantially longitudinally outwardly from the master link end 48. Thus, this passage is large enough to permit entry and passage therethrough of the bushing of the master pin and bushing assembly 17.

Prior to describing the nature of the pin and bushing assemblies 16 and 17 and the manner in which they articulately interconnect the standard and master links, it may be noted that only one master link construction may be required in any given track structure. In other words, at least one such structure comprising master links 12 and master pin and bushing assembly 17 is utilized in order to facilitate assembly and disassembly of the track. On the other hand, due to repairing track breakage in the field or similar circumstances, additional master constructions may be utilized. Suffice it to say that the endless track may consist of any number of master links 12 or connecting assemblies 17.

The pin and bushing assemblies 16 and 17 may be and preferably are identical as shown particularly in FIGURE 3 of the drawings. Accordingly, like numerals are employed to designate corresponding parts thereof, while the description will proceed with respect to assembly 16. The standard pin and bushing assembly 16 comprises a cylindrical bushing 56 firmly secured as by a press-fit in the openings 46 in the end portions 44 of the master link pair 12, and projects slightly laterally outwardly therefrom so as to seat in the recess 36 in each end 28 of the standard links 10. The solid cylindrical link pin 58 extends through the bushing 56 and laterally therebeyond into the openings 32 in the ends 28 of the standard links 10. There is a relatively slight interference fit between the pin 58 and the bushing 56 and between the pin 58 and the openings 32 in the link ends 28 to insure ready insertion and removal of the pin therefrom, while permitting the pin to rotate relative to the bushing 56 and the master links 12. Each end of the pin contains a cylindrical concentric axially extending locking bore 60 which is wholly contained within the section or end 28 of the standard links 10 laterally outwardly from the joint formed between the mating surfaces of the standard and master pairs of links. Diametrically opposite radial slots 62 communicate with the locking bores 60 and are substantially axially coextensive with the latter. A spherical steel ball 64 of larger diameter than that of the locking bores 60 may be driven into each of the latter to spread the pin ends into firm interfering engagement with the ends 28 of the standard links 10 thereby maintaining the pin in position and the pairs of links 10 and 12 in assembled position.

The master pin and bushing assembly 17 may be identical to that previously described as aforementioned, and articulately interconnects the mating ends 30 and 48 of the standard links 14 and 12 in similar fashion. However, it should be noted that the particular construction of the master link ends 48 is such as to permit ready assembly of the ends of the master links 12 and standard links 14 in finally connecting the link structures to form the endless track, while permitting the use of a pin and bushing assembly 17 which is identical to the standard assemblies 16. The nature and advantages of this construction may be seen more clearly from a consideration of my copending United States application S.N. 751,262, filed July 28, 1958, and entitled "Master Link." For present purposes, it will be sufficient to observe that the master link construction 12 and standard link construction 14 will be at opposite ends of the articulated link construction which is to be joined to form the endless track. Thus, each link of each pair of standard links and master links 10, 12 and 14 is laterally fixedly spaced relative to the other link of each pair of links. The length of track is then placed upon the track roller frame about the various support wheels and then the ends 30 of the pair of standard links 14 are drawn into telescopic side-by-side mating engagement with the ends 48 of the pair of master links 12 using a suitable tool or tools where required as is well known in the art. As the pair of master links 12 and pair of standard links 14 are drawn together, the projecting ends of the bushing 56 of assembly 17 pass through the access passages 54 in the master links until they seat within the recesses 52 in the master link ends, at which time the openings 50 in the master links and the opening in bushing 56 are aligned. Thereafter, the master pin 58 is inserted in the manner previously described with respect to the assembly 16. As a final note, however, it should be observed that the master pin construction of this invention may be employed in conjunction with link connections entirely different from that disclosed in my copending application and as described briefly above.

From the structure thus far described, several advantages over the prior art may be noted. In the first instance, the locking bores 60 are cylindrical and therefore have less tendency to squeeze the locking balls 64 therefrom as is the case with tapered bores and tapered plugs. Secondly, the locking balls 64 are contained wholly within the locking bores thereby avoiding any interference with the track guards 8. Furthermore, the slotted pin ends increase the elasticity of the latter thereby insuring more firm interference fit with the cooperating ends of the links with a pin of minimum length and shorter locking bores. Moreover, the locking bores 60 are contained wholly within the section of the link ends 28 and 48, and do not extend into the area or joint of mating engagement of any adjacent mating track link ends thereby increasing the strength of the track structure at these critical joints.

The drawings also illustrate two embodiments of a ball-puller which may be employed in removing the locking balls 64 from the ends of the pins. In the first embodiment, shown in FIGURES 1 through 3, the ball-puller 66 is in the form of a thin or wafer-like plate of generally U-shaped configuration having an arcuately curved base end 68 disposable at the base of the locking bores 60 and forming a seat for each of the locking balls 64. The oppositely disposed substantially parallel leg portions 70 upstanding from the base portion are adapted to be confined within each of the slots 62 and are spaced so as to receive the locking balls 64. Each leg portion 70 terminates in a flange 72 which engages the outer face of the link end after insertion of the ball-puller within the pin end. It will be readily apparent that the ball-puller 66 is adapted to be mounted within the slotted and bored ends of the pin 58 prior to insertion of the locking balls 64 which readily pass between the legs of the ball-puller to a point adjacent the base thereof. As will be equally obvious, the ball prevents the ball-puller from being shaken loose from the ends of the pin while the track is in use. When it is desired to remove the locking balls to disassemble the track, it is only necessary to apply a prying force under the edge of a flange 72 thereby pulling the balls axially from the ends of the pin to relieve the interference between the pin ends and the associated track links to permit relatively easy removal of the pin.

FIGURE 4 illustrates another embodiment of a ball-puller which may be employed to remove a locking ball 64 when a ball-puller 66 is not employed. This ball-puller comprises two puller members 74 and 76, each of which includes a thin curved hook portion 78 and an extension or handle 80 formed integral therewith. The puller members 74 and 76 are substantially identical except that, in the member 76, the extension 80 is offset at 82 from the plane of the hook portion 78 for a purpose to be described. Each puller member 74 and 76 is manipulated to insert the thin hook portion 78 thereof into a slot 62 and the base of the locking bore 60 in the end of pin 58. Thus, by way of example, the puller member 74 may be manipulated from the dotted line position to the full line position of FIGURE 4 for this purpose, followed by similar manipulation of member 76 until both members are disposed in the full line position of FIGURE 4 with the ends of hook portions 78 abutting. The offset extension 80 of member 76 permits this manipulation without interference with member 74, and results in the extension 80 of member 74 overlying that of member 76. A pin 84 may then be inserted through aligned openings in the extensions 80 to lock the members 74 and 76 together during the subsequent pulling operation. To this end, a suitable tool may be employed to pull the assembled members 74 and 76 outwardly from the pin to remove the locking ball 64.

Having described a preferred form of the invention, other forms will now be apparent to those skilled in the art. Therefore, the embodiments shown in the drawings are merely for illustrative purposes, and are not intended to limit the scope of the invention which is defined by the claims which follow.

I claim:

1. A master pin for an endless chain comprising a cylindrical locking bore extending axially inwardly from each end of said pin, a radial slot in each end of said pin communicating with the locking bore therein, and a spherical locking ball removably insertable within each locking bore to spread the slotted ends of said pin.

2. A cylindrical master pin for an endless chain comprising a cylindrical locking bore extending axially inwardly from each end of said pin concentrically with the latter, a pair of diametrically opposite radial slots in each end of said pin communicating with the locking bore therein, and a spherical locking ball removably insertable within each locking bore to spread the slotted ends of said pin to a greater diameter than the intermediate portion of said pin between said pin ends.

3. A cylindrical master pin for an endless chain comprising a cylindrical locking bore extending axially inwardly from each end of said pin concentrically with the latter, a pair of diametrically opposite radial slots in each end of said pin communicating with and being substantially axially coextensive with the locking bore therein, and a spherical locking ball removably insertable within each locking bore to spread the slotted ends of said pin to a greater diameter than the intermediate portion of said pin between said pin ends.

4. A cylindrical master pin for an endless chain comprising a cylindrical locking bore extending axially inwardly from each end of said pin concentrically with the latter, a pair of diametrically opposite radial slots in each end of said pin communicating with and being substantially axially coextensive with the locking bore therein, a spherical locking ball removably insertable within each locking bore to spread the slotted ends of said pin to a greater diameter than the intermediate portion of said pin between said pin ends, and a ball-puller insertable within each slotted end of said pin and removable therefrom to remove said locking balls.

5. A cylindrical master pin for an endless track of a crawler tractor comprising a cylindrical locking bore extending axially inwardly from each end of said pin concentrically with the latter, a pair of diametrically opposite radial slots in each end of said pin communicating with and being substantially axially coextensive with the locking bore therein, a spherical locking ball removably insertable within each locking bore to spread the slotted ends of said pin to a greater diameter than the intermediate portion of said pin between said pin ends, a generally U-shaped ball-puller insertable within each end of said pin and removable therefrom to remove said locking balls, each of said ball-pullers including a base portion spanning said locking bore between said slots, and upstanding substantially parallel leg portions extending outwardly along said slots on opposite sides of said locking ball for access exteriorly of the ends of said pin.

6. A master pin connection between the adjacent ends of first and second links of an endless chain, said connection comprising a cylindrical master pin extending through the end of said first link for rotation relative thereto and into a cylindrical opening in the end of said second link, a cylindrical locking bore extending axially inwardly from the end of said pin a distance less than the axial extent of said opening in said second link, a radial slot in the end of said pin opening into said locking bore and being substantially axially coextensive with the latter, and a spherical locking ball removably insertable within said locking bore to spread the slotted end of the pin into frictional locking engagement with the end of said second link.

7. A master pin connection between the adjacent ends of first and second track links of an endless crawler tractor track, said connection comprising a cylindrical master pin extending through the end of said first link for rotation relative thereto and into a cylindrical opening in the end of said second link, a cylindrical locking bore extending axially inwardly from the end of said pin a distance less than the axial extent of said opening in said second link, a pair of diametrically opposed axially extending slots in the end of said pin opening into said locking bore, a generally U-shaped ball-puller including a base portion and opposed substantially parallel leg portions upstanding therefrom, said ball-puller being removably insertable within said pin end whereby said base portion extends between said pair of slots and said leg portions extend outwardly along said slots for access exteriorly of the end of said pin, and spherical locking ball removably insertable within said locking bore between the leg portions of said ball-puller to spread the slotted end of the pin into frictional locking engagement with the end of said second link, said ball-puller being removable whereby said base portion thereof pulls said locking ball outwardly from said locking bore.

8. An endless crawler tractor track comprising a first pair of laterally fixedly spaced track links having aligned cylindrical openings in one end thereof, a second pair of laterally fixedly spaced track links having aligned cylindrical openings in one end thereof, said ends of said first pair of track links being mounted between said ends of said second pair of track links, a bushing fixed within and extending between the openings in said first pair of track links, a solid cylindrical pin mounted within said bushing for rotation relative thereto and extending into the openings in said second pair of track links, a cylindrical locking bore extending axially inwardly from each end of said pin a distance less than the axial extent of the opening in each of said second pair of track links, a radial slot in each end of said pin opening into its associated locking bore and being substantially axially coextensive with the latter, and a spherical locking ball removably insertable within each locking bore to spread its associated pin end into frictional locking engagement with the ends of said second pair of track links.

9. An endless crawler tractor track comprising a first pair of laterally fixedly spaced track links having aligned cylindrical openings in one end thereof, a second pair of laterally fixedly spaced track links having aligned cylindrical openings in one end thereof, said ends of said first pair of track links being mounted between said ends of said second pair of track links, a bushing fixed within and extending between the openings in said first pair of track links, a solid cylindrical pin mounted within said bushing for rotation relative thereto and extending into the openings in said second pair of track links, a cylindrical locking bore extending axially inwardly from each end of said pin a distance less than the axial extent of the opening in each of said second pair of track links, a pair of diametrically opposed slots in each end of said pin opening into its associated locking bore and being substantially axially coextensive with the latter, a pair of generally U-shaped ball-pullers each including a base portion and opposed substantially parallel leg portions upstanding therefrom, one of said ball-pullers being removably insertable within each end of said pin whereby said base portion extends between a pair of said slots and said leg portions extend outwardly along said slots for access exteriorly of the ends of said pin, and a spherical locking ball removably insertable within each locking bore between the leg portions of said ball-puller to spread its associated pin end into frictional locking engagement with the ends of said second pair of track links, said ball-pullers being removable whereby said base portion thereof pulls its associated locking ball outwardly from a locking bore.

10. A ball-puller for use with a master pin connection between the adjacent ends of first and second track links of an endless crawler tractor track, said master pin connection being of the type comprising a cylindrical master pin extending through the end of said first link for rotation relative thereto and into a cylindrical opening in the end of said second link, a cylindrical locking bore extending axially inwardly from the end of said pin, a pair of diametrically opposed axially extending slots in the end of said pin opening into said locking bore, and a spherical locking ball removably insertable within said locking bore to spread the slotted end of the pin into frictional locking engagement with the end of said second link; said ball-puller being generally U-shaped and including a base portion and opposed substantially parallel leg portions upstanding therefrom and being removably insertable within said pin end whereby said base portion extends between said pair of slots and said leg portions extend outwardly along said slots for access exteriorly of the end of said pin, said ball-puller being removable whereby said base portion thereof pulls said locking ball outwardly from said locking bore.

References Cited in the file of this patent

UNITED STATES PATENTS

| | | |
|---|---|---|
| 1,924,161 | Knox | Aug. 29, 1933 |
| 2,780,830 | Kammerer | Feb. 12, 1957 |
| 2,893,788 | Yerian | July 7, 1959 |

FOREIGN PATENTS

| | | |
|---|---|---|
| 558,076 | Great Britain | Dec. 20, 1943 |
| 930,553 | Germany | July 18, 1955 |